March 15, 1949. T. ZINGG 2,464,663
SLOTTED WING FOR AIRCRAFTS
Filed Oct. 28, 1944 3 Sheets-Sheet 1

Inventor,
Theodore Zingg
By Young, Emery & Thompson
atty.

March 15, 1949.    T. ZINGG    2,464,663
SLOTTED WING FOR AIRCRAFTS
Filed Oct. 28, 1944    3 Sheets-Sheet 2
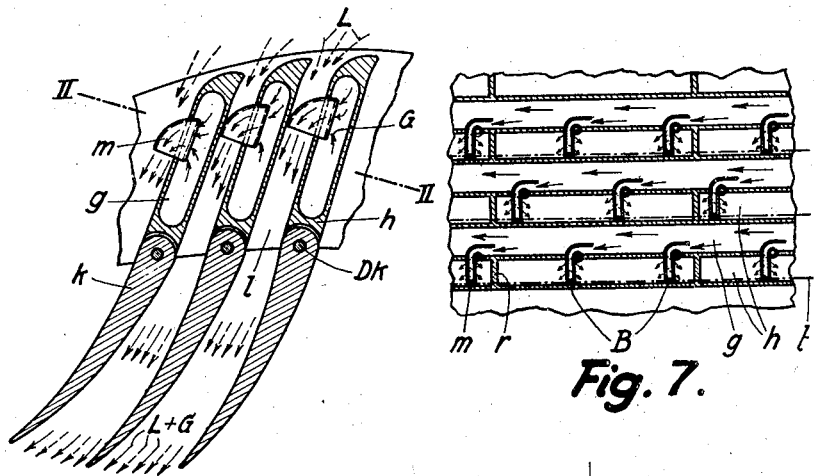
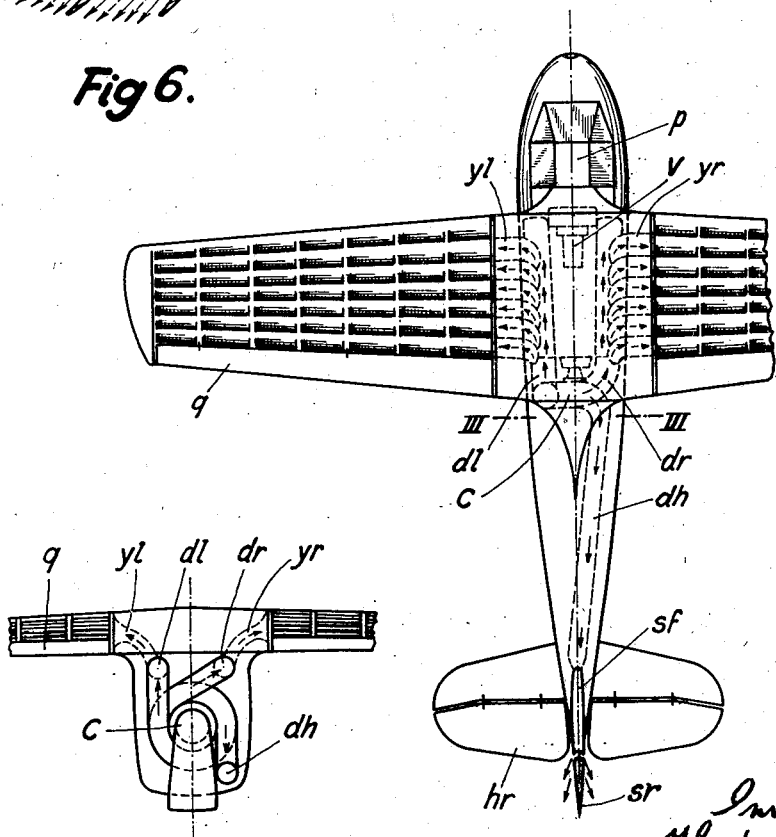

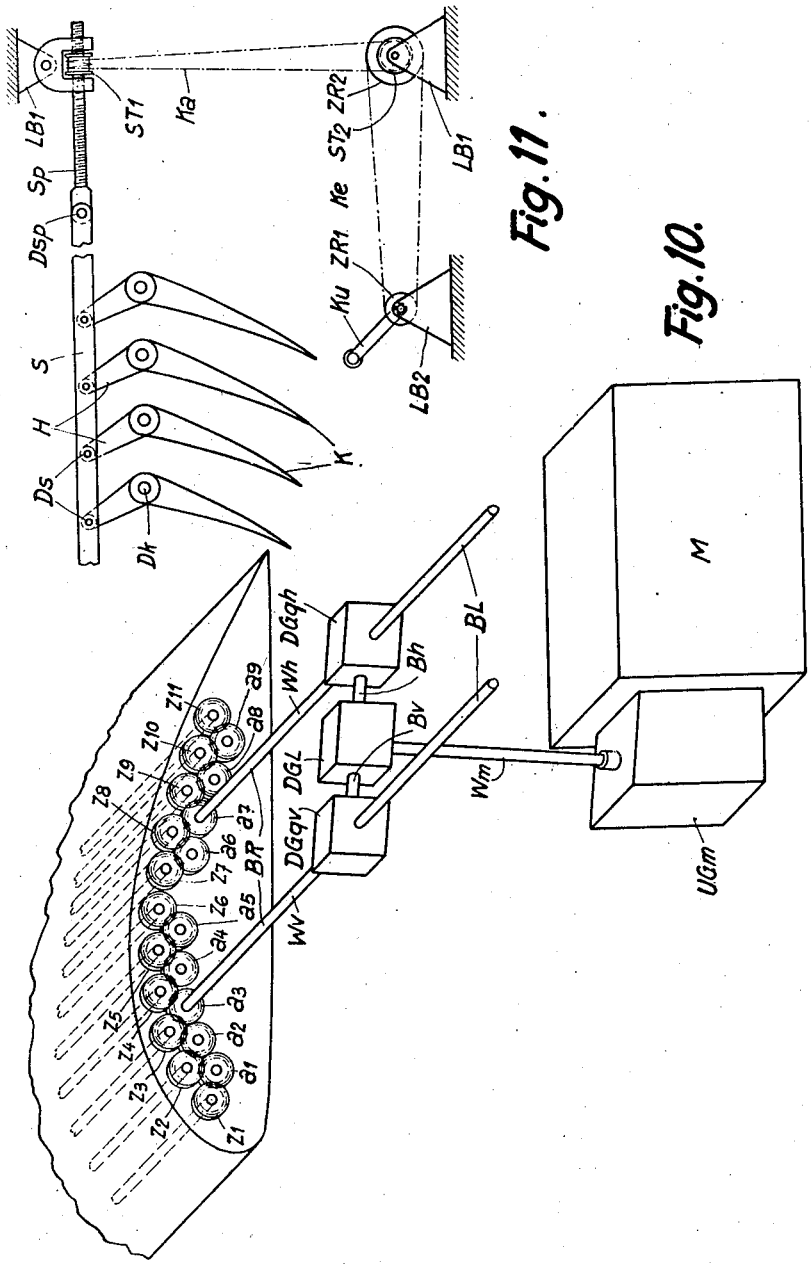

Patented Mar. 15, 1949

2,464,663

UNITED STATES PATENT OFFICE 2,464,663

SLOTTED WING FOR AIRCRAFT

Theodor Zingg, Rorschach, Switzerland

Application October 28, 1944, Serial No. 560,863
In Switzerland August 21, 1943

Section 1, Public Law 690, August 8, 1946.
Patent expires August 21, 1963

5 Claims. (Cl. 244—12)

This invention relates to reaction-propelled aeroplanes. The types of direct-lift machines known up till now, mostly of the rotating wing type, such as autogyros, and combinations of normal aeroplanes and autogyros, are equipped with one or several outer rotatable lift and propulsion means. Apart from the question of the power to be delivered, of the possible horizontal and vertical speeds of flight, of stabilisation, and of safety, these outer drive means involve additional dangers when the aeroplanes are used in an intense traffic as is to be expected in future.

The aeroplane according to the invention is such that no outer, dangerous drive means are necessary. It not only allows normal and acrobatic flying but even backward flying, vertical start and vertical landing and can be constructed as a pure jet-driven aeroplane.

According to the invention a reaction-propelled aeroplane comprising supporting parts with slots opening at the underside thereof for the discharge of air or gas, is characterised by profile flaps adjustably arranged between adjacent slots on the underside of said supporting parts so as to form together with said supporting parts an adjustable aerodynamic section, the slots, together with the flaps, forming nozzles producing the reaction pressure, means also being provided for pivoting or swinging the profile flaps to adapt said section and the exhaust direction of the nozzles to different flying conditions.

By the term "supporting part" is to be understood any part of the aircraft which is so disposed that in flight it is capable of imparting "lift" or propulsive effect to the aeroplane. The slots may, therefore, be provided on wings, on the fuselage or on the tail unit. By "air," the air of the atmosphere is understood which flows from the upper side of the supporting parts and is driven through the slots, or even air sucked from another side of the aeroplane and driven through the slots. By the term "gas," any gas or air is meant which is supplied by power sources on the aeroplane.

The profile flaps may be operated either at will or automatically by well-known mechanical or pneumatic devices.

Where the aeroplane is used in the atmospheric layer, the air necessary for producing a lift or propulsion is taken wholly or for the greater part from above the supporting parts, is then fed through the slots under pressure and exhausted at the underside of the supporting parts in the desired direction.

When the aeroplane according to the invention is used as a jet-driven machine in the higher atmosphere or superatmospheric space, the air or gas necessary for producing a lift or propulsion is wholly or for the greater part supplied to the slots from a power source on the aeroplane and exhausted at the underside of the supporting parts in the desired direction.

The stabilisation of the aeroplane in normal and acrobatic flight is carried out with well-known means such as ailerons, rudder and elevator units, as well as by the control of air flow through the slots in the supporting parts and operation of the profile flaps.

In the case of low forward speed (start, steep flight, landing) the stabilisation of the aeroplane about the vertical axis may be effected either by supplying air or gas from the power source to the rudder unit or wholly or partially by selective operation of the profile flaps to displace the application point of the resultant reaction.

The stabilisation of the aeroplane can be simplified by the combination of the means according to the invention with one or several tractor or lifting airscrews.

If the power source of the aeroplane fails to function, the profile flaps can be closed wholly or partially so that landing may be effected by glide as with a usually heavier-than-air craft.

The accompanying drawings illustrate, by way of examples, different embodiments of the object of invention.

Fig. 6 is a partial section of a wing of an aeroplane in which air or gas enters the slots through nozzles.

Fig. 7 is a section along line II—II in Fig. 6.

Fig. 8 is a plan view of a direct-lift machine in which air or gas is supplied to the slots by nozzles and in which, besides the lift and propulsion means according to the invention, no further drive means of known kind is provided.

Fig. 9 is a section along line III—III of Fig. 8.

Fig. 10 shows in a schematic way how the bladed rotors of Fig. 5 can be driven.

Fig. 11 illustrates diagrammatically a mechanical means for controlling the flaps.

Figure 1:
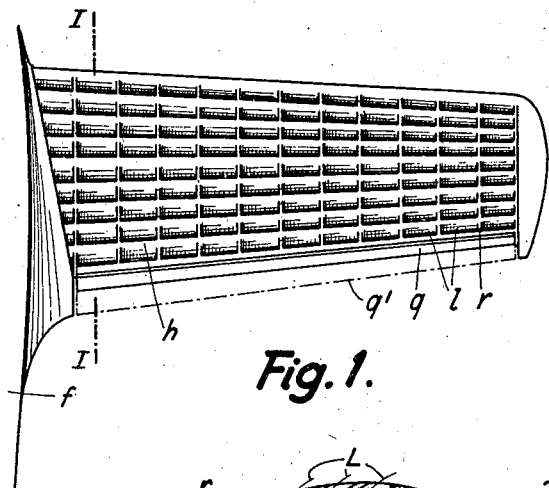
Fig. 1 is a plan view of a lattice wing of an aeroplane.
Figure 2:
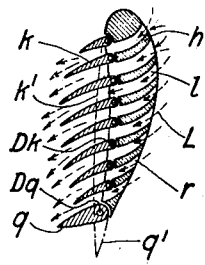
Fig. 2 is a section along line I—I in Fig. 1.

Referring now to Figs. 1 and 2, the slots lying between the wing parts $h$ formed as spars run in the direction of the span of the wing. The spars $h$ are connected with one another by ribs $r$. The wing is fixed to the fuselage $f$. The aileron $g$ mounted on the wing is shown in full lines pulled down and in chain-dotted lines ($q'$) in aligned position.

In Fig. 2 the lattice structure of the wing is shown, the slots $l$ lying between the spars $h$ and the profile flaps $k$ being rotatable around the axes $D_k$. These profile flaps are represented by full lines in fully open and by chain-dotted lines ($k'$) in the fully closed position. The aileron $q$ can be rotated with the profile flaps $k$ around its axle $D_q$ or, for the purpose of aileron deflection, independent of the profile flaps $k$. The slots $l$ run obliquely to the wing surface and approximately parallel to the transverse axis. They might, however, even lie perpendicularly to the wing surface and obliquely to the transverse axis. The profile flaps $k$ can be rotated both forward and backward and, in closed position, conform to the profile of the wing.

Fig. 11 shows, by way of example, how the flaps $k$ in Fig. 2 and the following examples can be controlled. The levers H are in rigid connection with the flaps $k$ and pivoted to the bar S. On the one end of this latter a threaded spindle $S_p$ is linked which engages in a self-locking manner the drum $ST_1$ mounted on the pivoting support $LB_1$. On a rotation of this drum the bar S is axially displaced, thereby rotating the flaps $k$. Any rotation of the crank $K_u$ mounted on a stationary support $LB_2$ is transmitted to the toothed wheel $ZR_2$ by the toothed wheel $ZR_1$ and the chain $K_e$. A cable $K_a$ runs over the drum $ST_2$ rigidly connected with the wheel $ZR_2$ and over the drum $ST_1$. It may be seen that by moving the crank $K_u$ the flaps $k$ are rotated.

Figure 3:
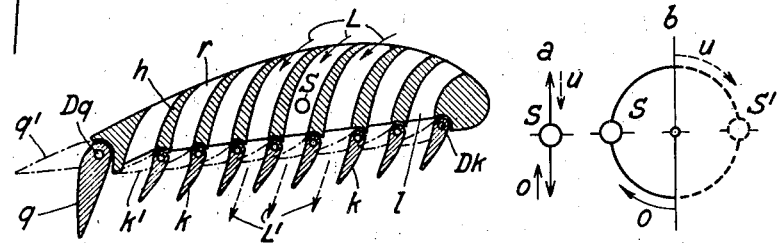
Fig. 3 is a cross section through a wing with profile flaps of an aeroplane in which the wings are either arranged as beating or as rotating wings.
Figure 4:
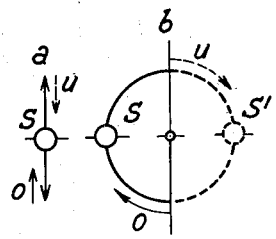
Fig. 4 illustrates the change in the position of the centre of gravity of a wing according to Fig. 3, operated either as beating or as rotating wing.

The wing shown in Fig. 3 is mounted and operated in a well-known manner as beating wing, that is, a wing having a substantially vertical rising and falling movement, or as a rotating wing where it moves in a circular path about a substantially horizontal axis, while the profile flaps are correspondingly moved for closing or opening the slots $l$. The form of the slots $l$ and of the profile flaps $k$ is chosen so that, on the upward movement of the wing parts, the air can flow through the same with a resistance as small as possible. The profile flaps $k$ are somewhat shorter than in the first example. On the upward movement of the wing the profile flaps are opened, the aileron $q$ moved down and air, indicated by arrows L, flows downwards through the slots lying between the spars $h$ and the profile flaps $k$, while on the downward movement of the wing the profile flaps $k$ are in closed position ($k'$) the aileron $q$ in the aligned position ($q'$) and the slots $l$, therefore, closed so that the whole wing is used for the downward acceleration of the air. Here too, the rotation of the profile flaps $k$ and the aileron $q$ takes place around the axles $D_k$ and $D_q$. If the wing illustrated in Fig. 3 is formed as beating wing, the centre of gravity S is moved according to the diagram $a$ in Fig. 4, if, however, the wing is mounted as rotating wing, the centre of gravity S is moved according to the diagram $b$ of Fig. 4. In the latter case, O indicates the upward and $u$ the downward component of travel.

Figure 5:
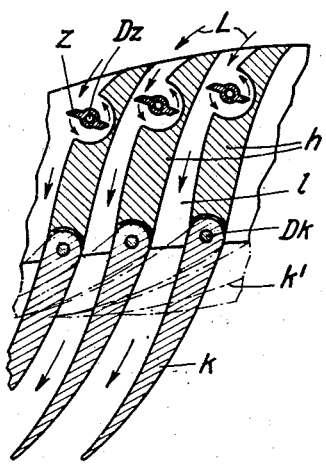
Fig. 5 is a partial section of a wing of an aeroplane with mechanical means installed in the wing for forcing air through the slots.

In Fig. 5 bladed rotors $z$ are installed for driving air through the slots. They are rotatable around the axle $D_z$ mounted on spars $h$ and, on their rotation, convey air from the upper wing surface or, in the case of jet drive, gas from non-illustrated feed channels through the slots $l$ towards the bottom. Here too, $k$ and $k'$ indicate the profile flaps in the fully open and fully closed positions respectively. The rotors $z$ are driven by a non-illustrated power source (motor) by means of change and differential gears which are likewise not shown. The rotors are arranged in different groups and the drives of the groups are so effected that the speed of rotation of the groups can be selectively and independently controlled at will or automatically. In this way a displacement of the point of application of the resultant reaction and an eventual change in the value of the same is obtained and thereby a stabilisation of the aeroplane rendered possible.

The bladed rotors $z$ can, for instance, be driven by a device shown in Fig. 10. The inner ends of the shafts of the bladed rotors $z$ are provided with toothed wheels $Z_1$—$Z_{11}$ which for the right and left wing half, are arranged in two groups $Z_1$—$Z_6$ and $Z_7$—$Z_{11}$.

These groups are separately driven by the shafts $W_v$ and $W_h$ by means of the toothed wheels $a1$—$a5$ and $a6$—$a9$ respectively. The differential gears $DG_{qv}$ and $DG_{qh}$ allow to differentiate the speeds of the bladed rotors in the right and left wing half by means of the brake devices $Bv$ and $Bh$ (lateral control). The differential gear $DGl$ permits the speeds of the drive shafts $W_v$ and $W_h$ of being differentiated by means of the brake devices $Bv$ and $Bh$ (longitudinal control). Power transmission takes place from the motor M over the transmission gear $UGm$, the shaft $Wm$, the differential gear $DGl$, the differential gears $DG_{qv}$ and $DG_{qh}$ and the shafts $Wv$ and $Wh$ to the different groups of bladed rotors.

The brake devices BR, BL, $Bv$ and $Bh$ are only schematically indicated in Fig. 10. They may consist of brake rollers with band brakes which latter are coupled with the control column in order to be operated by the latter in accordance with the desired change in position.

Fig. 6 shows an example in which air or a gas is delivered to the slots through stationary or movable mixing and metering nozzles $m$. These nozzles may deliver additional air, exhaust gas or gases of combustion which, in Fig. 6, are indicated by arrows G. These gases are led to the nozzles through hollow spaces $g$ of the spars $h$. By the introduction of these gases through the nozzles $m$ into the slots $l$, air indicated by arrows L is drawn from the upper wing surface through the slots L so that a mixture of gas and air escapes at the bottom. In the case of a pure jet-propelled plane any air supply is lacking and totally replaced by gas supply from a non-illustrated power source. In this case the slots are closed at their top. The mixing and metering nozzles $m$ are preferably arranged close to the top of the wing in order to obtain below sufficient space for energy mixture and transformation of kinetic into pressure energy. Instead of through the hollow spaces $g$ the gas might also be supplied to the nozzles through special, non-illustrated conduits. As may be seen from Fig. 7, the lower ends B of the nozzles $m$ (the back ends in the aeroplane) are each fixed to an operating bar $t$ with the aid of which the nozzles may be adjusted to vary the amount of gaseous medium discharged from the slots. By displacement of the points of attachment B of each nozzle $m$ to the bar $t$, the relative discharge of each slot may be independently adjusted. The different bars $t$ of each supporting part may be arranged in several groups in such a way that the operation can take place in groups either at will or automatically, whereby the degree of reaction produced may be varied and the value and the point of application of the total lifting force adjusted in accordance with the requirements of stabilisation of the aeroplane. Control flaps might also take the place of the nozzles.

In the machine according to Figs. 8 and 9 only the wings are provided as lift and propulsion means and gas (air or a mixture of gas and air) used as means transmitting energy to the slots. The turbo blower C coupled with the back end of the motor V supplies the necessary additional air, as indicated in Fig. 6 by arrows L, through the pressure pipes $dr$ and $dl$ and the bends $y$, $r$ and $yl$ to the spars $h$ of the wings, that is, to the hollow spaces $g$ and from there through the mixing nozzles $m$ into the slots $l$ (see Figs 6 and 7). The pilot cabin with control equipment, fuel etc. are placed in the forward part of the fuselage, while the pressure pipe $dh$ leads additional air necessary for directional stability on small speeds of flight through the vertical fin $sf$ to the rudder $sr$ and, if desired, to the elevator $hr$. As shown in Fig. 9, the aeroplane is formed as a high-wing monoplane.

Instead of hinging the profile flaps to the supporting parts, they could be rigidly connected with portions of these supporting parts which are themselves pivotally mounted relative to the main structure for the purpose of changing the cross sections of the slots.

Devices facing the upper side of the supporting parts and exposed supply conduits leading to the nozzles or control flaps are provided with heat insulation in order to diminish loses of energy by radiation.

In certain positions of the profile flaps an automatic draining of the boundary and turbulent layer on the upper side of the supporting parts is effected.

Where the slots of the supporting parts run in the direction of the span, the solid portions of these parts defining the slots and connected with one another by cross ribs can be formed as members stiff against bending and torsion and can simultaneously serve for carrying the power transmission means.

Precautions may be taken so that for horizontal and high-speed flight the energy-carrying medium (air, gas) is deflected from the supply channels in the supporting parts and is exhausted by the driving device (e. g. motor and blower) with the maximum energy delivery.

What I claim is:

1. In an aircraft, a carrying member with channels open towards the underside of said carrying member, flaps rotatably mounted between adjacent channels on the underside of said carrying member so as to form together with said carrying member an adjustable aerodynamic section, said channels together with said flaps forming nozzles, and means in connection with said flaps to rotate the latter for adapting said section and the exhaust direction of said nozzles to different flying conditions.

2. In an aircraft, a carrying member with channels open towards the underside of said carrying member, flaps rotatably mounted between adjacent channels on the underside of said carrying member so as to form together with said carrying member an adjustable aerodynamic section, said channels together with said flaps forming nozzles, a device in connection with said flaps to rotate the latter for adapting said section and the exhaust direction of said nozzles to different flying conditions, and means in said nozzles for imparting energy to the medium flowing through said nozzles.

3. In an aircraft, a carrying member with channels connecting the upper with the lower surface of said carrying member, flaps rotatably mounted between adjacent channels on the underside of said carrying member so as to form together with said carrying member an adjustable aerodynamic section, said channels together with said flaps forming nozzles to convert within these latter energy of the air flowing through the nozzles from the upper towards the lower surface of the carrying member, a device in connection with said flaps to rotate the latter for adapting said section and the exhaust direction of said nozzles to different flying conditions, and means in said nozzles for imparting energy to the air flowing from the upper surface of the carrying member through said nozzles.

4. In an aircraft, a carrying member with channels open towards the underside of said carrying member, flaps rotatably mounted between adjacent channels on the underside of said carrying member so as to form together with said carrying member an adjustable aerodynamic section, said channels together with said flaps forming nozzles, means in connection with said flaps to rotate the latter for adapting said section and the exhaust direction of said nozzles to different flying conditions, and devices for imparting energy to the medium flowing through said nozzles to obtain a control and a stabilizing effect upon the aircraft.

5. In an aircaft, a carrying member with channels open towards the underside of said carrying member and spaced apart by hollow carrying portions, flaps rotatably mounted between adjacent channels on the underside of said carrying member so as to form together with said carrying member an adjustable aerodynamic section, said channels together with said flaps forming nozzles, a device in connection with said flaps to rotate the latter for adapting said section and the exhaust direction of said nozzles to different flying conditions, and means connecting the inside of said hollow carrying portions with said nozzles for leading a medium from said inside to said nozzles.

THEODOR ZINGG.

REFERENCES CITED

The following references are of record in the file of this patent:

UNITED STATES PATENTS

| Number | Name | Date |
| --- | --- | --- |
| 1,630,938 | Griffin | May 31, 1927 |
| 1,766,330 | Korwin-Sokolowski | June 24, 1930 |
| 1,780,298 | Icre | Nov. 4, 1930 |
| 1,888,452 | Clark | Nov. 22, 1932 |
| 1,891,650 | Nachtsheim | Dec. 20, 1932 |
| 1,907,160 | Schauman | May 2, 1933 |
| 1,957,413 | Price | May 1, 1934 |
| 1,993,419 | Stalker | Mar. 5, 1935 |
| 2,376,834 | Thompson | May 22, 1945 |

FOREIGN PATENTS

| Number | Country | Date |
| --- | --- | --- |
| 347,051 | Great Britain | April 23, 1931 |
| 383,821 | Great Britain | Nov. 24, 1932 |
| 589,059 | Germany | Oct. 31, 1935 |